(12) United States Patent
Bito

(10) Patent No.: US 11,379,100 B2
(45) Date of Patent: Jul. 5, 2022

(54) INFORMATION PROCESSING APPARATUS TO REDUCE NUMBER OF OPERATIONS DURING TRANSITIONING OF SCREEN AND NON-TRANSITORY COMPUTER READABLE MEDIUM STORING

(71) Applicant: FUJIFILM Business Innovation Corp., Tokyo (JP)

(72) Inventor: Koji Bito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/148,564

(22) Filed: Jan. 14, 2021

(65) Prior Publication Data
US 2022/0057904 A1     Feb. 24, 2022

(30) Foreign Application Priority Data
Aug. 21, 2020   (JP) ............................. JP2020-140374

(51) Int. Cl.
*G06F 3/0484* (2022.01)
*G06F 9/451* (2018.01)
(Continued)

(52) U.S. Cl.
CPC .......... *G06F 3/0484* (2013.01); *G06F 3/0489* (2013.01); *G06F 9/453* (2018.02); *G06F 11/3438* (2013.01)

(58) Field of Classification Search
CPC .... G06F 11/3438; G06F 9/453; G06F 3/0489; G06F 3/0484; G06F 11/3414;
(Continued)

(56) References Cited

U.S. PATENT DOCUMENTS 5,877,759 A * 3/1999 Bauer .................... G06Q 10/06
                                                      719/317
2011/0072361 A1   3/2011   Sakai et al.
(Continued)

FOREIGN PATENT DOCUMENTS

| JP | 2007087119 | 4/2007 |
|---|---|---|
| JP | 2011066850 | 3/2011 |
| JP | 2013162140 | 8/2013 |

OTHER PUBLICATIONS

Edwards Benje, How to Show File Explorer's Preview Pane on Windows 10, https://www.howtogeek.com/668414/how-to-show-file-explorers-preview-pane-on-windows-10/, Apr. 23, 2020 (Year: 2020).*

*Primary Examiner* — Nicholas Ulrich
(74) *Attorney, Agent, or Firm* — JCIPRNET

(57) ABSTRACT

An information processing apparatus includes a processor configured to transition from a first state to a second state in a case where a first operation is received from a user in the first state, transition from the second state to the first state in a case where a second operation is received from the user in the second state, and present, in a case where the second operation is detected after the first operation, a function of transitioning from the first state to the second state and transitioning from the second state to the first state or a function of transitioning from the first state to a third state corresponding to the second state and transitioning from the third state to the first state to the user, in which the number of operations of executing the function is smaller than the number of operations including the first operation and the second operation.

14 Claims, 12 Drawing Sheets

(51) Int. Cl.
*G06F 11/34* (2006.01)
*G06F 3/0489* (2022.01)

(58) Field of Classification Search
CPC ............... G06F 11/34; G06F 2201/865; G06F 2201/86; H04L 67/22
See application file for complete search history.

(56) References Cited

U.S. PATENT DOCUMENTS

| | | | | |
|---|---|---|---|---|
| 2018/0173403 A1* | 6/2018 | Carbune | ............ | G06F 3/04817 |
| 2018/0275851 A1* | 9/2018 | Laubach | ............ | G06F 3/04892 |
| 2019/0187987 A1* | 6/2019 | Fauchere | ............ | G06F 9/45512 |
| 2019/0235726 A1* | 8/2019 | Vasudev | ................ | H04L 67/22 |

\* cited by examiner

INFORMATION PROCESSING APPARATUS TO REDUCE NUMBER OF OPERATIONS DURING TRANSITIONING OF SCREEN AND NON-TRANSITORY COMPUTER READABLE MEDIUM STORING

CROSS-REFERENCE TO RELATED APPLICATIONS

This application is based on and claims priority under 35 USC 119 from Japanese Patent Application No. 2020-140374 filed on Aug. 21, 2020.

BACKGROUND

(i) Technical Field

The present invention relates to an information processing apparatus and a non-transitory computer readable medium storing a program.

(ii) Related Art

For example, JP2013-162140A discloses that an intended operation can be performed quickly in such a way that, in a case where a sensor in a remote controller detects an operation, an analysis unit of an operation prediction unit predicts a next operation of a user by referring to a state storage unit and a reference table on the basis of a result of the detection by the sensor, the analysis unit instructs a main controller and an OSD generator to perform OSD display on an icon relating to the next operation on the basis of a result of the prediction, and the user operates the displayed icon using an arrow button or the like of the remote controller.

SUMMARY

Here, in a case where a work is performed using an application or the like and a user repeats a state transition between a first state and a second state, that is, from the first state to the second state and from the second state to the first state, the number of operations required for the state transition increases as the number of repeated state transitions increases, and thus an operation required for the state transition becomes troublesome for the user.

Aspects of non-limiting embodiments of the present disclosure relate to an information processing apparatus and a non-transitory computer readable medium storing a program that enable the user to recognize a function of capable of performing the state transition with a small number of operations rather than an operation of performing the state transition, performed by the user, between the first state and the second state in a case where the state transition between the first state and the second state is repeated by an operation of the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to transition from a first state to a second state in a case where a first operation is received from a user in the first state, transition from the second state to the first state in a case where a second operation is received from the user in the second state, and present, in a case where the second operation is detected after the first operation, a function of transitioning from the first state to the second state and transitioning from the second state to the first state or a function of transitioning from the first state to a third state corresponding to the second state and transitioning from the third state to the first state to the user, in which the number of operations of executing the function is smaller than the number of operations including the first operation and the second operation.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described in detail with reference to the accompanying drawings.

First Exemplary Embodiment

Hardware Configuration of Information Processing Apparatus

Figure 1:
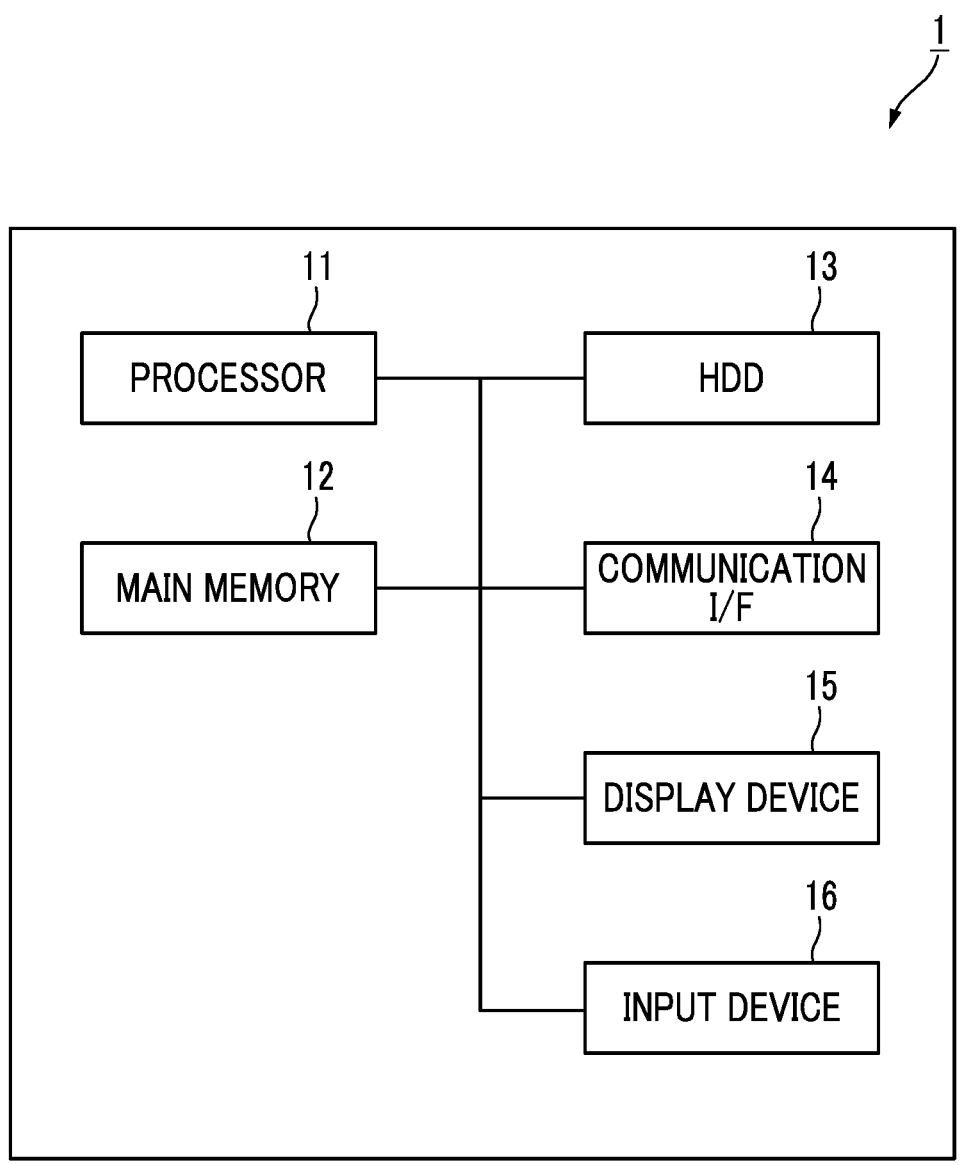
FIG. 1 is a diagram illustrating a hardware configuration example of an information processing apparatus according to an exemplary embodiment.

FIG. 1 is a diagram illustrating a hardware configuration example of an information processing apparatus 1 of an exemplary embodiment.

As illustrated in FIG. 1, the information processing apparatus 1 includes a processor 11 which is a calculator, a main memory 12 which is a memory, and a Hard Disk Drive (HDD) 13. Furthermore, the information processing apparatus 1 includes a communication I/F 14 for performing communication with the outside, a display device 15 such as a liquid crystal display and an EL display, and an input device 16 such as a keyboard or a mouse. The display device 15 and the input device 16 may be configured with a touch panel display that receives an input by a contact operation with respect to a display surface that displays an image.

The processor 11 executes various software, such as an Operating System (OS) and an application, and realizes various functions which will be described later.

The main memory 12 is a storage region that stores the various software, data used for execution of the software, and the like.

The HDD 13 is a storage region that stores the various software, input data with respect to the various software, output data from the various software, and the like. Specifically, the HDD 13 of the exemplary embodiment stores a program that realizes document handling software which is an application and which will be described later.

Document Handling Software

Next, a screen which is displayed on the liquid crystal display by the document handling software will be described.

The document handling software of the exemplary embodiment digitizes and manages, for example, a paper document read by a scanner. In addition, the document handling software of the exemplary embodiment collectively manages document data created by different applications as a single document. Furthermore, the document handling software can perform an editing operation, such as drawing markers, adding comments, sticking notes, or stamping, on an electronic document.

The information processing apparatus 1 of the exemplary embodiment displays a predetermined screen on the liquid crystal display, which is an example of the display device 15, based on the document handling software. The display of the screen in the information processing apparatus 1 is realized by the processor 11, the main memory 12, and the HDD 13. In addition, the information processing apparatus 1 receives an operation which is performed by a user with respect to the screen displayed based on the document handling software. The reception of the operation with respect to the screen displayed by the information processing apparatus 1 is performed by the keyboard or the mouse, which is an example of the input device 16.

The operation by the user includes a click of superimposing a pointer on a target image, pressing a button of the mouse, and releasing the button of the mouse. In addition, the operation by the user includes a double click of superimposing the pointer on the target image, pressing the button of the mouse, and releasing the button of the mouse, consecutively. In addition, the operation by the user includes a drag of moving the mouse while pressing the button of the mouse in a state in which the pointer is superimposed on the target image, and releasing the button after the movement. Furthermore, the operation by the user includes a key operation of pressing and releasing a key on the keyboard. Then, in the description of the exemplary embodiment, a method for counting the number of operations performed by the user is assumed that the number of operations is one in a case where each operation, such as the click, the double click, the drag, or the key operation, is performed once. For example, in a case where one image on the screen is clicked and another image is clicked thereafter, the number of operations is two.

Figure 2:
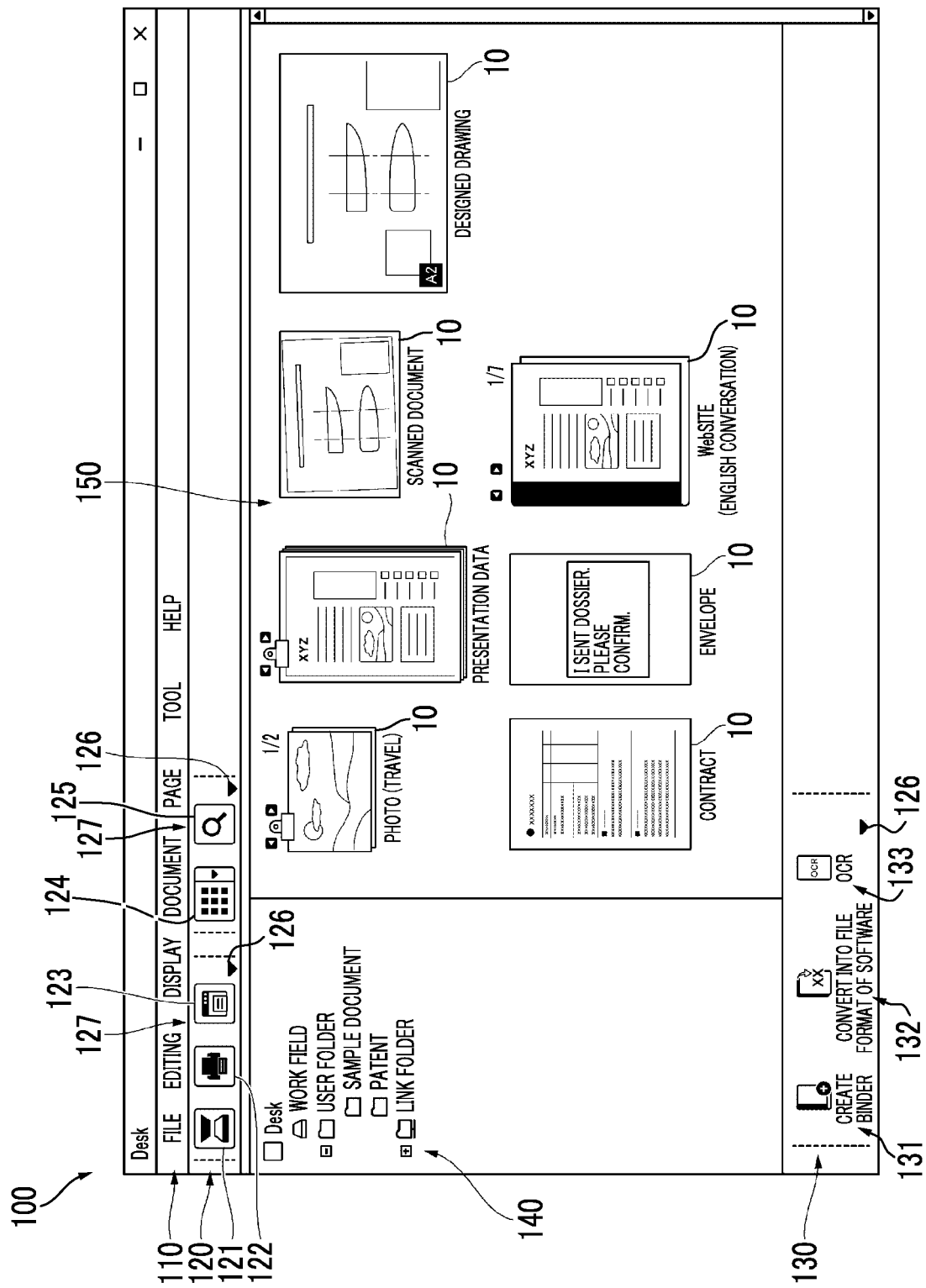
FIG. 2 illustrates an example of a desk screen for thumbnail display.

FIG. 2 is an example of a desk screen 100 for thumbnail display.

Figure 3:
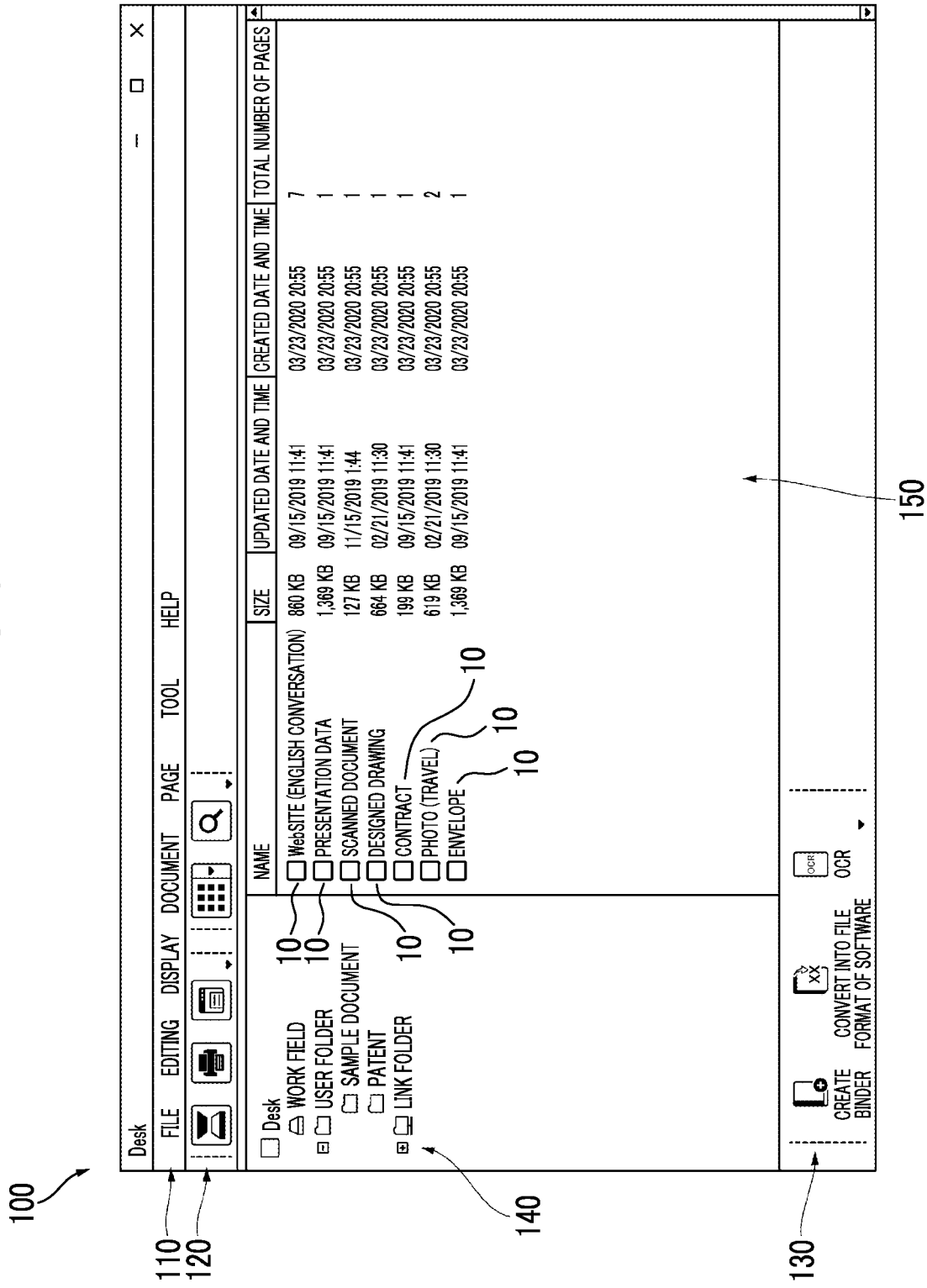
FIG. 3 illustrates an example of the desk screen for text display.

FIG. 3 is an example of the desk screen 100 for text display.

As illustrated in FIG. 2, the document handling software of the exemplary embodiment displays a file 10 and the desk screen 100 that manages a folder for storing the file 10 on the liquid crystal display device. The desk screen 100 of the exemplary embodiment integrally manages not only the file 10 created by the software but also a file 10 created by another application. The file 10 of the exemplary embodiment is recorded, for example, in the HDD 13, and includes a document, an image, and a set of information such as a database.

Desk Screen 100

As illustrated in FIG. 2, the desk screen 100 includes a menu bar 110 that displays menus, a first toolbar 120 that displays icons for executing functions, and a second toolbar 130 that displays icons for executing the functions at positions different from the position of the first toolbar 120. In addition, the desk screen 100 includes, for example, a folder unit 140 that represents a configuration of the folder in which a plurality of files stored in the HDD 13 are collected, and a workspace unit 150 that represents content of a folder selected in the folder unit 140.

The menu bar 110 displays a plurality of menu items that can be executed on the desk screen 100 side by side. In a case where a selection operation is received by the user, each menu item executes a received menu or displays an item obtained by performing further division on the menu item.

The first toolbar 120 is arranged on an upper side of the desk screen 100. Then, the first toolbar 120 displays a plurality of icons for executing functions. For example, the first toolbar 120 includes a file icon 121 for opening the file 10, a printing icon 122 for executing printing of the file 10, and a preview icon 123 for opening a preview screen 300 which will be described later. In addition, the first toolbar 120 includes an arrangement icon 124 for automatically arranging the file 10 and a search icon 125 for searching for the file 10.

The preview icon 123 is an image that receives an operation of displaying the preview screen 300, which will be described later, in the desk screen 100. The information processing apparatus 1 displays the preview screen 300 in a case where a click of the preview icon 123 by the user is received in a state in which the preview screen 300 is not displayed. On the other hand, in a case where the information processing apparatus 1 receives the click of the preview icon 123 from the user in a state in which the preview screen 300 is displayed, the information processing apparatus 1 non-displays the preview screen 300.

The arrangement icon 124 is an image that receives an operation of arranging the files 10 displayed in the workspace unit 150 in the order according to a specified rule and arranging the files 10 at predetermined positions. It is exemplified that the specified rule is based on objective information such as the order of creation of the files 10, the order of names of the files 10, and the order of file sizes of the files 10. For example, it is exemplified that the arrangement at the predetermined positions is alignment of ends of the files 10 or arrangement at equal intervals in the workspace unit 150. Ina case where the information processing apparatus 1 receives a click with respect to the arrangement icon 124 in a state in which a plurality of files 10 are arranged at random positions in the workspace unit 150 according to a random order by the user, the plurality of files 10 are arranged at predetermined positions according to the order of specified rule. In a case where the information processing apparatus 1 receives an operation with respect to the arrangement icon 124, the information processing apparatus 1 resets content of arrangement information which will be described later.

In addition, the first toolbar 120 is provided with a setting button 126 for setting icons to be displayed in the first toolbar 120. In a case where the setting button 126 is clicked, the information processing apparatus 1 displays a setting field (not shown) having items for specifying icons to be displayed and icons to be not displayed in the first toolbar 120. In a case where the items to be displayed in the setting field are selected by the user, the information processing apparatus 1 adds the icons corresponding to the items to the first toolbar 120. In addition, in a case where selection of the items to be displayed in the setting field is released by the user, the information processing apparatus 1 non-displays the icons corresponding to the items in the first toolbar 120.

Furthermore, the first toolbar 120 includes a section 127 in which a plurality of icons are collected. The section 127 includes at least one or more icons. In the example illustrated in FIG. 2, a first section 127 includes a file icon 121, a printing icon 122, and a preview icon 123. In addition, a second section 127 includes the arrangement icon 124 and the search icon 125. In addition, each section 127 is provided with the setting button 126. Then, in a case where the information processing apparatus 1 receives from the user an operation of performing non-display in units of the section 127 using the setting button 126, the information processing apparatus 1 collectively performs non-display on the icons included in the section 127.

The second toolbar 130 displays a plurality of icons for executing functions that can be performed on the files 10 displayed in the workspace unit 150. For example, the second toolbar 130 includes a binder icon 131 for executing a function of collecting a plurality of pages or a plurality of files 10. In addition, the second toolbar 130 includes a conversion icon 132 for executing a function of converting a file having a file format different from that of the software into a file format of the software, and an Optical Character Recognition (OCR) icon 133 for performing optical text recognition with respect to the file 10.

The folder unit 140 is a display region for performing a tree display that visually represents a hierarchical relationship between the folders, displaying the files 10 in a folder as a list, and enabling the file 10 to be stored with respect to the folder.

The workspace unit 150 is a work display region that is displayed to correspond to the folder selected by the folder unit 140. Then, the workspace unit 150 perform display using any of thumbnail display that usually displays the files 10 in the selected folder as thumbnails and text display that usually displays the files 10 in the selected folder as a list using text of a file name. In the workspace unit 150, selection to perform the display using any of the thumbnail display and the text display is received from the user, for example, by the menu bar 110.

Thumbnail Display

As illustrated in FIG. 2, the thumbnails are reduced images for performing list display of a plurality of images. The thumbnails are displayed on the screen as display elements that visually identify document data.

In the workspace unit 150 for the thumbnail display, a plurality of thumbnails are displayed at predetermined positions in an initial state.

Then, in the thumbnail display, the user can drag and move the thumbnail of the file 10, and arrange the file 10 at a random position. The user can arrange the electronic file 10 at the random position in the workspace unit 150 like arranging a physical document on an actual desk. For example, in the workspace unit 150, the user collectively arranges the plurality of files 10 having high relation, such as a project and a theme, to be close to each other, or arranges a file having high seriousness or priority which are subjective to the user at a position which is easy to be used. Then, in a case where the user arranges the file 10 at a random position, the information processing apparatus 1 creates arrangement information for managing coordinate information of each file in the workspace unit 150. Then, the arrangement information is stored in the HDD 13.

In addition, in the workspace unit 150 for the thumbnail display, a thumbnail display size can be changed. In a case where the information processing apparatus 1 receives an operation of turning a mouse wheel while pressing a <Ctrl> key from the user, the thumbnail display size is changed.

Text Display

As illustrated in FIG. 3, in the workspace unit 150 for the text display, the plurality of files 10 each displayed in text are arranged in a list according to, for example, the order of the file names or the order of creation date and time of the files 10. In the workspace unit 150 for the text display, it is not possible for the user to arrange the files 10 at random positions.

Viewer Screen

Figure 4:
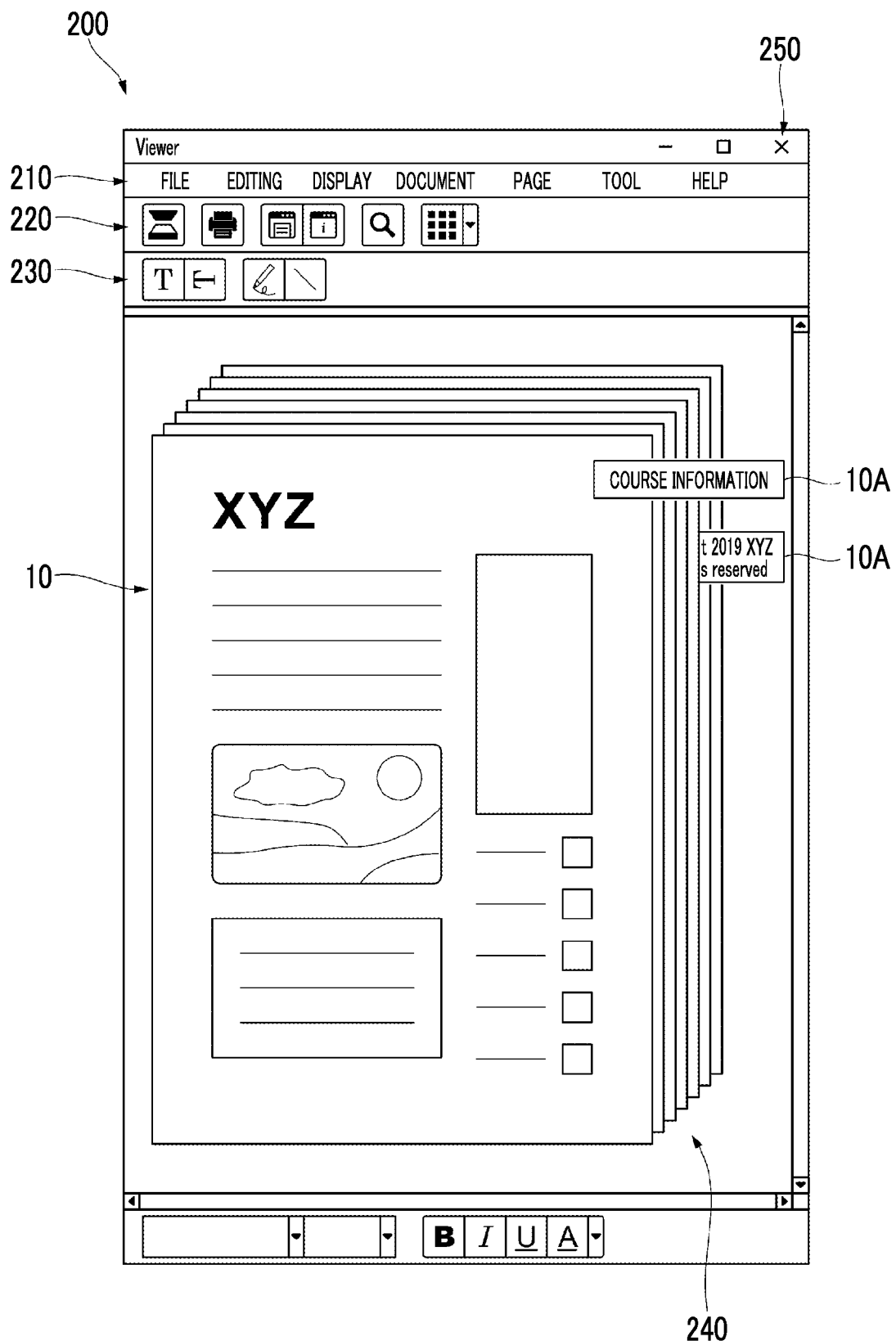
FIG. 4 illustrates an example of a viewer screen of the exemplary embodiment.

FIG. 4 is an example of a viewer screen 200 of the exemplary embodiment.

The viewer screen 200 is a screen that opens a specific file 10 and displays content of the file 10. The viewer screen 200 expands the content of the file 10 on the liquid crystal display in a case where a double click operation is performed on the file 10 displayed on the workspace unit 150 of the desk screen 100. The viewer screen 200 is displayed even in the double click with respect to the file 10 in any of display modes of the file 10 displayed as the thumbnail by the thumbnail display and the file 10 displayed in the text by the text display, in the workspace unit 150.

In addition, the viewer screen 200 is displayed in a separate window from the desk screen 100 on the liquid crystal display. A position where the viewer screen 200 is displayed on the liquid crystal display is randomly specified by the user. The viewer screen 200 is displayed while being superimposed on the desk screen 100, or is displayed side by side without being superimposed on the desk screen 100.

As illustrated in FIG. 4, the viewer screen 200 includes a menu bar 210 that displays menus and a first toolbar 220 that displays icons for executing functions. In addition, the viewer screen 200 includes a second toolbar 230 that displays icons for executing functions at positions different from the position of the first toolbar 220, and a file display unit 240 that is a region for displaying the content of the file 10.

Basic configurations of the menu bar 210, the first toolbar 220, and the second toolbar 230 are the same as the configurations of the menu bar 110, the first toolbar 120, and the second toolbar 130 of the desk screen 100.

The file display unit 240 displays the file 10 in a size larger than, for example, the thumbnail. In addition, the file display unit 240 receives, from the user, the editing operation of editing the file 10 and a viewing operation of turning a page with respect to the file 10 configured with a plurality of pages. In addition, in a case where the file 10 is provided with a tag 10A, the file display unit 240 displays the tag 10A.

The viewer screen 200 is a screen created for each file 10. In a case where the double click is performed with respect to one file 10 in the workspace unit 150, the information processing apparatus 1 expands one viewer screen 200 that displays the content of one file 10. In addition, in a case where the double click is performed with respect to another file 10, the information processing apparatus 1 expands another viewer screen 200 that displays content of the other file 10 in addition to the one viewer screen 200.

Then, in a case where a close button 250 provided on each viewer screen 200 is clicked, the information processing apparatus 1 closes the viewer screen 200.

Preview Screen

Figure 5:
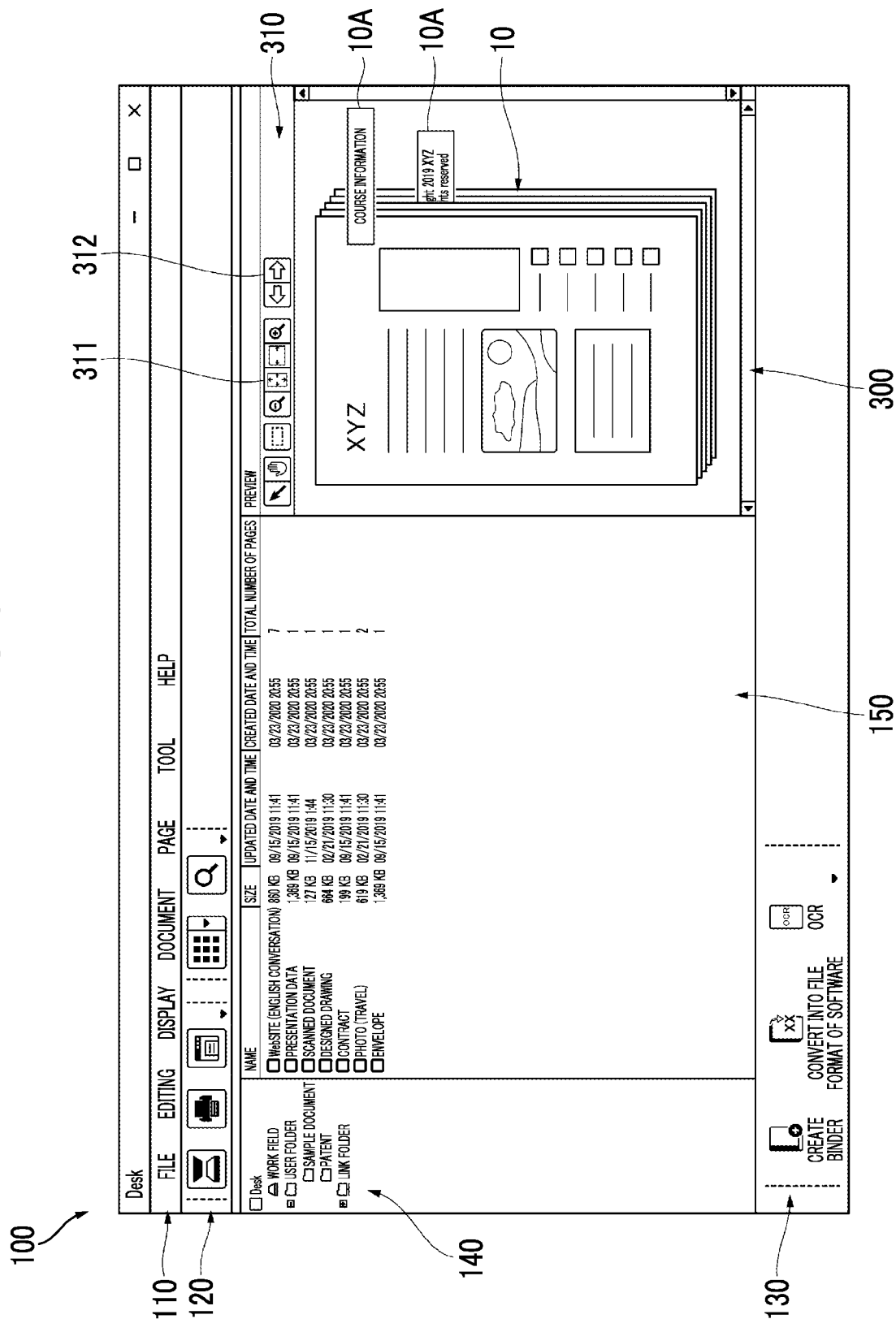
FIG. 5 illustrates an example of a preview screen in a file display state.

FIG. 5 is an example of the preview screen 300 in a file display state.

Figure 6:
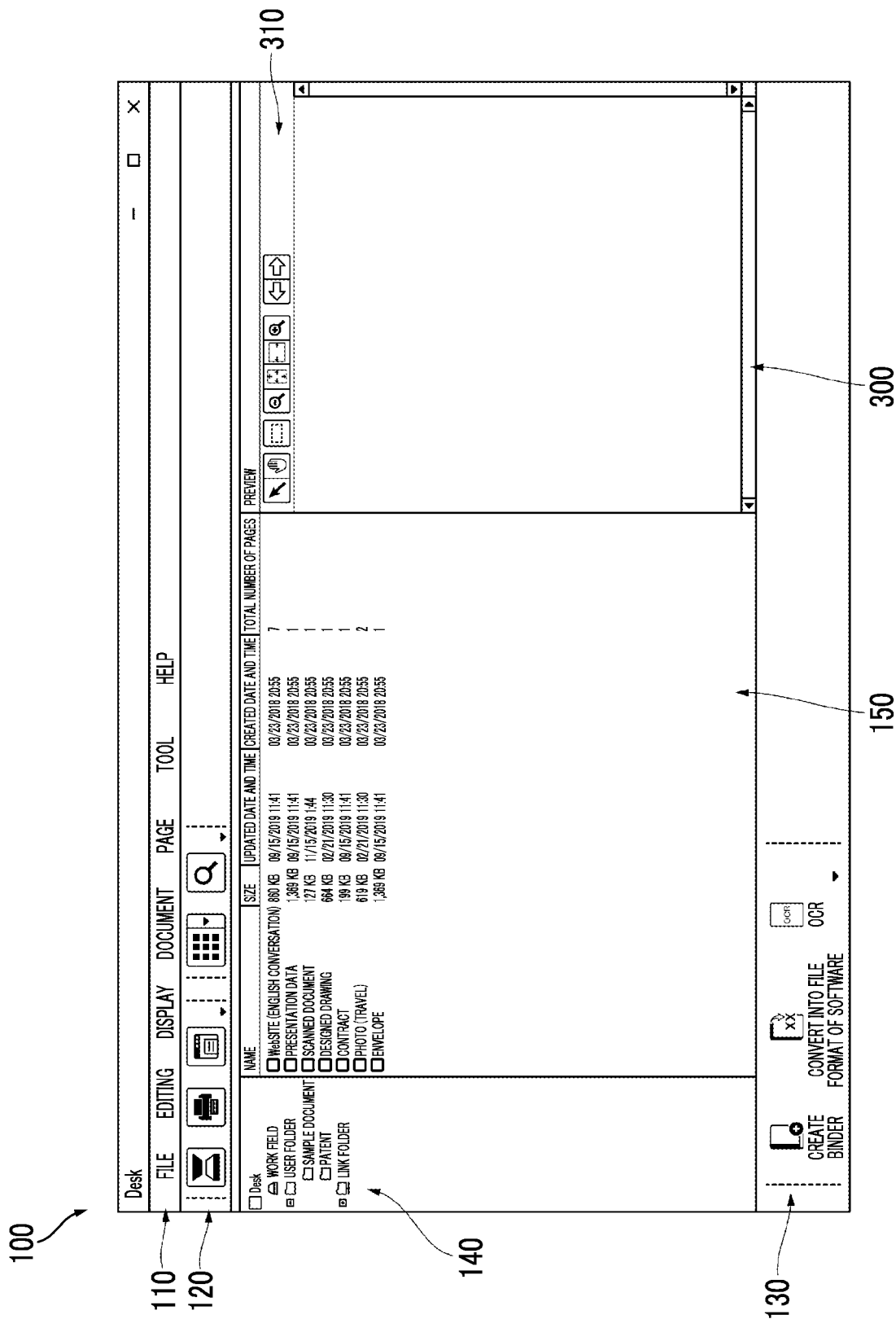
FIG. 6 illustrates an example of the preview screen in a non-file display state.

FIG. 6 is an example of the preview screen 300 in a non-file display state.

As illustrated in FIG. 5, the preview screen 300 is displayed as a part of the desk screen 100 in the desk screen 100.

The preview screen 300 includes a toolbar 310. The toolbar 310 includes an adjustment icon 311 for adjusting the enlargement magnification of the display of the file 10 and a turning icon 312 for turning a page of the file 10.

The preview screen 300 is a screen that, in a case where receiving a click with respect to any of the files 10 displayed in the workspace unit 150, displays the content of the file 10. In the preview screen 300, only one file 10 is a display target. For example, the preview screen 300 displays one file 10 in response to the click with respect to the one file 10 in the workspace unit 150. Then, in a case where the preview screen 300 receives a click with respect to another file 10 in the workspace unit 150 in a state in which the one file 10 is displayed, the preview screen 300 displays the other file 10 instead of the one file 10.

The display of the file 10 in the preview screen 300 is performed by a click performed with respect to any of the file 10 displayed in the workspace unit 150 for the thumbnail display and the file 10 displayed in the workspace unit 150 for the text display.

In addition, in a case where the file 10 is provided with the tag 10A, the preview screen 300 displays the tag 10A.

Then, the preview screen 300 is similar to the viewer screen 200, for example, in a point that the content of the file 10 is displayed and the toolbar is included.

Then, as illustrated in FIG. 6, the preview screen 300 does not display the file 10 in a state in which none of the files 10 is selected in the workspace unit 150. For example, in a case where a click is performed on a place different from display places of the plurality of files 10 in the workspace unit 150, that is, a blank place is clicked in a state in which one file 10 is displayed in the preview screen 300, the information processing apparatus 1 becomes a blank state in which the file 10 is not displayed in the preview screen 300.

Enlarged Display Screen

Figure 7:
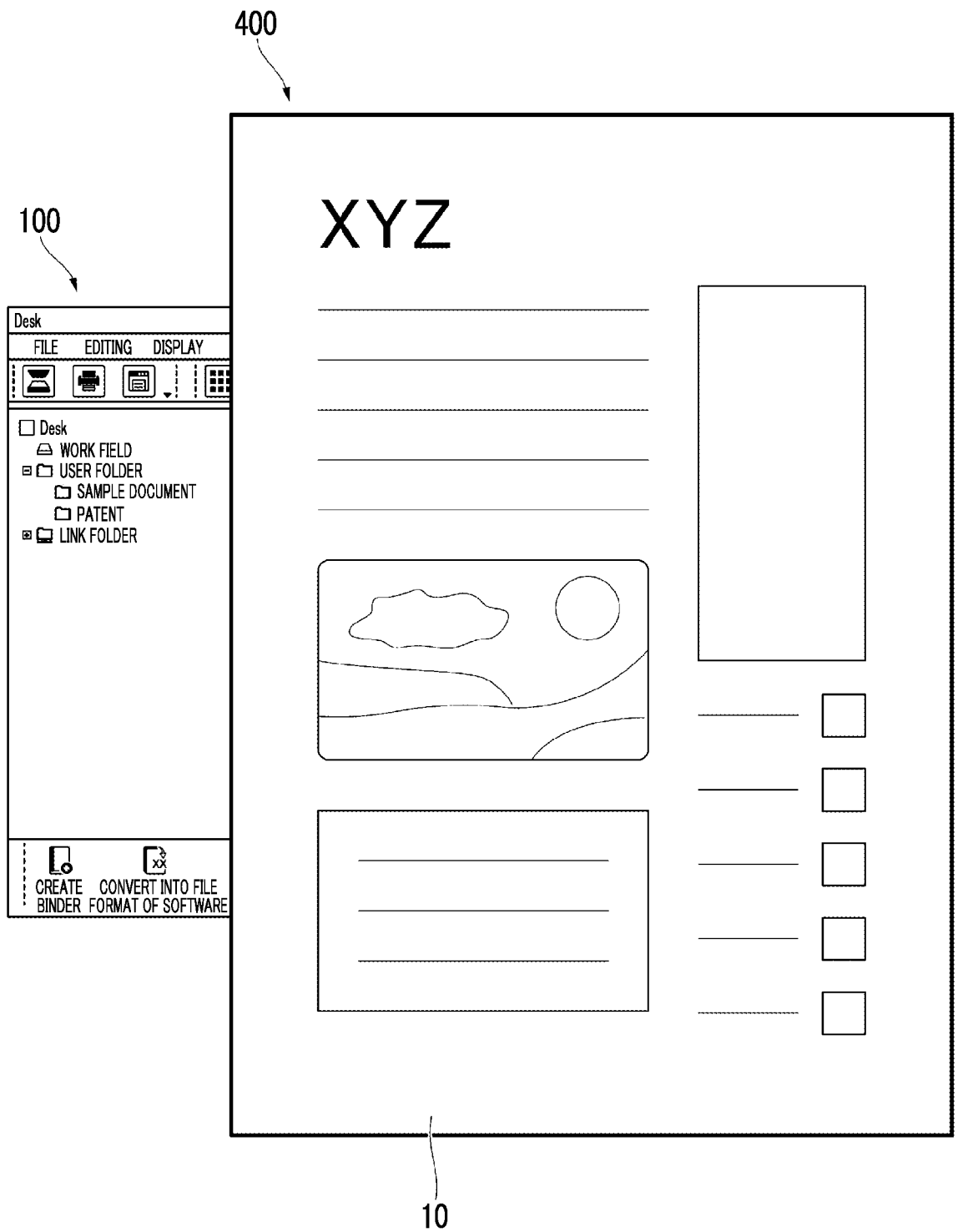
FIG. 7 illustrates an example of an enlarged display screen of the exemplary embodiment.

FIG. 7 is an example of an enlarged display screen 400 of the exemplary embodiment.

As illustrated in FIG. 7, the enlarged display screen 400 is a screen that displays the content of the file 10 in a state in which the desk screen 100 is displayed. The enlarged display screen 400 is displayed by performing a key operation of both a <Ctrl (control)> key and a <Shift (shift)> key of the keyboard in a state in which a pointer of the mouse is superimposed on the file 10 displayed in the workspace unit 150 (see FIG. 2) of the desk screen 100. The enlarged display screen 400 is displayed when the above operation is performed with respect to the file 10 displayed in the workspace unit 150 for the thumbnail display. That is, in a case where the above operation is performed with respect to the file 10 displayed in the workspace unit 150 for the text display, the enlarged display screen 400 is not displayed.

Then, the enlarged display screen 400 is continuously displayed as long as both the <Ctrl> key and the <Shift> key are pressed.

The enlarged display screen 400 is an image whose outer frame is used as an edge of a display target file 10. In addition, although the tag 10A provided on the file 10 is not displayed on the enlarged display screen 400, only a part on an inside of the edge of the file 10 in the tag 10A is displayed.

In addition, the enlarged display screen 400 is displayed so that a center of the file 10 on the enlarged display screen 400 is aligned with a center of the thumbnail of the file 10 in the workspace unit 150. Then, the enlarged display screen 400 is superimposed on the workspace unit 150 of the desk screen 100 and is displayed on a higher layer on a front side of the desk screen 100. Accordingly, in a case where the display target file 10 is displayed on the enlarged display screen 400, the user looks like the thumbnail of the file 10 is enlarged.

Furthermore, on the enlarged display screen 400, in a case where the file 10 configured with a plurality of pages and a right button or a left button of the mouse is pressed, display in which the pages are turned in a forward direction or a reverse direction of the page is performed.

The enlarged display screen 400 is similar to the viewer screen 200 in a point of representing the content of the file 10. However, unlike the viewer screen 200, the enlarged display screen 400 does not include, for example, the menu bar 210, the first toolbar 220, and the like. In addition, the enlarged display screen 400 displays an image having content corresponding to the file display unit 240 of the viewer screen 200. In this way, the enlarged display screen 400 displays a part of the viewer screen 200.

Then, in a case where the user releases the <Ctrl> key and the <Shift> key of the keyboard in a state in which the enlarged display screen 400 is displayed, the enlarged display screen 400 is non-displayed. In a case where the pointer of the mouse is removed from the thumbnail of the target file 10, the enlarged display screen 400 is also non-displayed.

Thereafter, in a case where the information processing apparatus 1 receives the key operation of pressing both the <Ctrl> key and the <Shift> key of the keyboard in a state in which the pointer of the mouse is superimposed again on another file 10 displayed in the workspace unit 150 (see FIG. 2) of another desk screen 100, the enlarged display screen 400 corresponding to the other file 10 is displayed.

Function Proposal

Next, a proposal of a function relating to an operation performed on the screen by the user (hereinafter, referred to as the function proposal) by the document handling software configured as described above will be described.

For example, in a case where an operation of changing the screen from the first state to the second state and returning from the second state to the first state is detected, the information processing apparatus 1 presents, to the user, a function of transitioning from the first state to a third state corresponding to the second state and transitioning from the third state to the first state. In this case, the number of operations for executing the function to be proposed to the user is smaller than the number of operations when changing from the first state to the second state and transitioning from the second state to the first state.

Hereinafter, the information processing apparatus 1 of the first exemplary embodiment will be described in detail.

Figure 8:
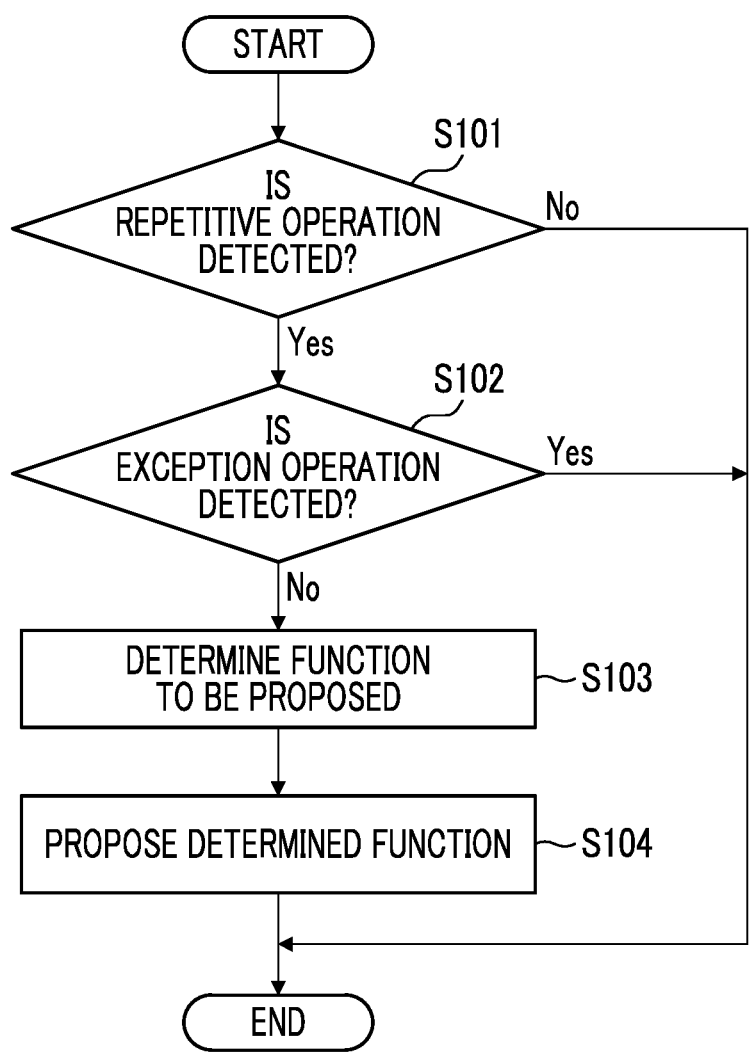
FIG. 8 is a flowchart illustrating a function proposal operation of the exemplary embodiment.

FIG. 8 is a flowchart illustrating a function proposal operation of the exemplary embodiment.

As illustrated in FIG. 8, the information processing apparatus 1 determines whether or not a repetitive operation is detected (S101). Here, it is exemplified that the repetitive operation is a reciprocating operation in which, for example, the screen or the like transitions from the first state to the second state and then transitions from the second state to the first state. Furthermore, it is exemplified that the repetitive operation is, for example, a repeated operation of transitioning the screen or the like from the first state to the second state, transitioning from the second state to the first state, and further transitioning from the first state to the second state.

Determination of execution of the function proposal based on the repetitive operation may be performed based on a fact that the above-described reciprocating operation or the repeated operation is performed within a predetermined time.

Then, in a case where the repetitive operation is not detected (No in S101), the information processing apparatus 1 ends the process. On the other hand, in a case where the repetitive operation is detected, the information processing apparatus 1 determines whether or not an exception operation is detected (S102).

In a case where the exception operation is detected (Yes in S102), the information processing apparatus 1 ends the process. On the other hand, in a case where the exception operation is not detected (No in S102), the information processing apparatus 1 determines content of the function to be proposed (S103). The content of the function to be proposed is determined according to the content of the repetitive operation. Then, the function to be proposed in the exemplary embodiment is a function whose number of operations is smaller than the number of operations of repetitive operations.

Then, the information processing apparatus 1 presents the function determined to be proposed to the user (S104). Specifically, the information processing apparatus 1 displays content explaining the determined function on the liquid crystal display which is being used by the user. In addition, it is exemplified that a timing of presenting the function is, for example, when the repetitive operation is performed, when the user ends the use of the software, when the software is being activated in a case where the user ends the use of the software and the user uses the software next time, and the like.

Subsequently, as an example of a case where the function is proposed to the user, an example of proposing a function of displaying the enlarged display screen 400 will be described in detail.

As illustrated in FIG. 2, in a state in which the desk screen 100 is displayed (for example, an example of the first state), the information processing apparatus 1 receives the double click with respect to the file 10 in the workspace unit 150 from the user (for example, an example of a first operation). Then, as illustrated in FIG. 4, the information processing apparatus 1 transitions from the desk screen 100 to a state in which the viewer screen 200 is displayed (for example, an example of the second state). Thereafter, the information processing apparatus 1 receives a click with respect to the close button 250 (for example, an example of a second operation) within a predetermined time such as 10 seconds. Then, the information processing apparatus 1 non-displays the viewer screen 200 and transitions from the viewer screen 200 to the desk screen 100 (see FIG. 2).

Then, the information processing apparatus 1 proposes a function in a case where the operation of clicking the close button 250 to close the viewer screen 200 by the user is detected after the operation of double clicking the file 10 in the workspace unit 150. As described above, the function to be proposed is performed by performing the key operation on both the <Ctrl> key and the <Shift> key in a state in which the pointer of the mouse is superimposed on the file 10 and transitioning to the enlarged display screen 400 (for example, an example of the third state). The enlarged display screen 400 displays the content of the file 10 in the same manner as the viewer screen 200. Accordingly, the proposal of the enlarged display screen 400 is a useful function for the user who is displaying the viewer screen 200.

Here, operations performed by the user in the case where the desk screen 100 is transitioned to the viewer screen 200 and the viewer screen 200 is transitioned to the desk screen 100 are as follows. (1) The user superimposes the pointer on the file 10 in the workspace unit 150 of the desk screen 100 and double clicks the file 10. Thereafter, (2) the user clicks the close button 250 of the viewer screen 200 to close the viewer screen 200. In this case, the total number of operations by the user is two.

On the other hand, in the function to be proposed, the operation performed by the user is superimposing the pointer on the file 10 in the desk screen 100 and performing the key operation on both the <Ctrl> key and the <Shift> key. In this case, the number of operations by the user is one. In this way, the number of operations of the function to be proposed is smaller than the number of operations, which are sources of the function to be proposed, by the user.

Figure 9:
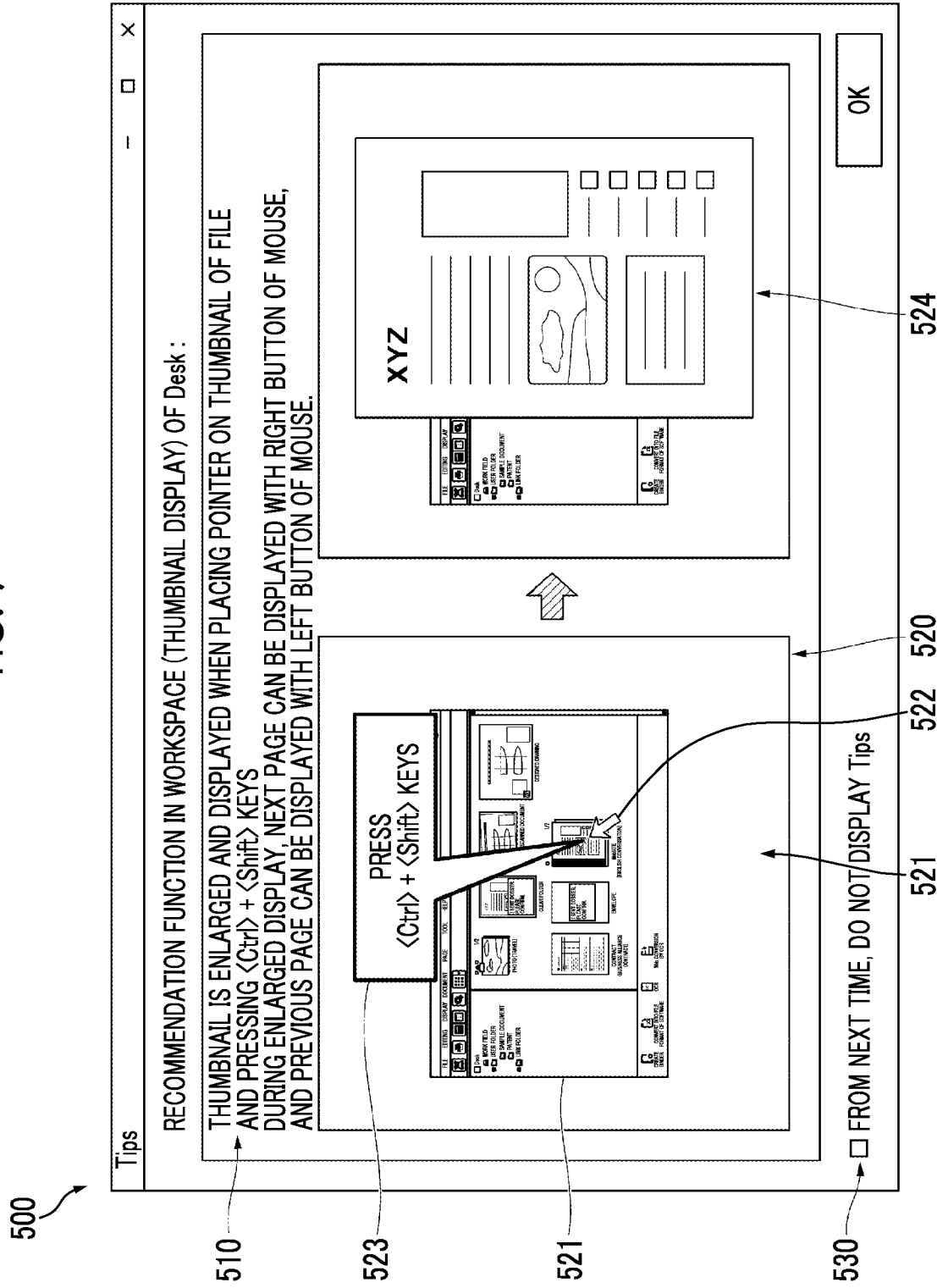
FIG. 9 illustrates an example of a proposal screen in a case where a function of the exemplary embodiment is presented to a user.

FIG. 9 is an example of a proposal screen 500 in a case where a function of the exemplary embodiment is presented to the user.

As illustrated in FIG. 9, the proposal screen 500 includes an explanatory text 510 for explaining the function to be proposed, and an explanatory diagram 520 for explaining the function to be proposed and an operation of the function to be proposed.

The explanatory text 510 expresses operations required for the user to execute the function to be proposed in sentences. The example illustrated in FIG. 9 is an example of an operation for displaying the enlarged display screen 400, and the explanatory text 510 describes an operation of the mouse and the keyboard in detail.

In addition, the explanatory diagram 520 expresses the operation required for the user to execute the function to be proposed using an image. In addition, the explanatory diagram 520 expresses transition of the screen due to the operation using the image. The explanatory diagram 520 displays an image 521 that represents an example of the desk screen 100 actually displayed on the liquid crystal display, together with an image 522 of the pointer of the mouse and an explanatory diagram 523 of an operation of the keyboard. In addition, the explanatory diagram 520 represents an image 524 that represents an example of the enlarged display screen 400 that is transitioned from the desk screen 100 after the operation of the proposed function is performed.

Furthermore, the proposal screen 500 includes a reception image 530 that receives a user's specification to not display the proposal screen 500 for a function having the same content or to not execute the function proposal itself from the next time.

The proposal screen 500 may propose not only a single function but also a plurality of functions.

As described above, in the first exemplary embodiment, the function of displaying the enlarged display screen 400 is proposed in a case where the repetitive operation, due to reciprocating, of transitioning from the desk screen 100 to the viewer screen 200 and transitioning from the viewer screen 200 to the desk screen 100 is detected.

The information processing apparatus 1 may propose the function of displaying the enlarged display screen 400 in a case where the repetitive operation, due to repetition, of transitioning from the desk screen 100 to the viewer screen 200, transitioning from the viewer screen 200 to the desk screen 100, and transitioning from the desk screen 100 to the viewer screen 200 is detected.

For example, the information processing apparatus 1 receives the double click with respect to one file 10 displayed in the workspace unit 150 of the desk screen 100. Then, the information processing apparatus 1 transitions from the desk screen 100 to the state in which the viewer screen 200 representing the one file 10 is displayed. Thereafter, the information processing apparatus 1 receives the click of the close button 250 from the user and closes the viewer screen 200 which displays the one file 10. Thereafter, the information processing apparatus 1 receives the double click with respect to another file 10 displayed in the workspace unit 150 of the desk screen 100. Then, the information processing apparatus 1 transitions, on the liquid crystal display, from the desk screen 100 to the state in which the viewer screen 200 which represents the other file 10 is displayed. Thereafter, the information processing apparatus 1 receives the click of the close button 250 from the user and closes the viewer screen 200 which displays the other file 10.

Then, as described above, in a case where the repetitive operation, in which the operation of, by the user, clicking the close button 250 to close the viewer screen 200 after the operation of double clicking the file 10 in the workspace unit 150 is repeatedly performed, is detected, the information processing apparatus 1 proposes the function of displaying the enlarged display screen 400 by performing the key operation on both the <Ctrl> key and the <Shift> key while superimposing the pointer of the mouse on the file 10. The enlarged display screen 400 is similar to the viewer screen 200 in displaying the content of the file 10, and is a useful function for the user who is displaying the viewer screen 200.

As a condition for the function proposal, it is exemplified that the repeatedly performed repetitive operation is performed within the predetermined time such as 5 seconds.

Here, in a case where the operation of transitioning from the desk screen 100 to the viewer screen 200 is repeatedly performed, the operation performed by the user is as follows. (1) The user superimposes the pointer on one file 10 in the workspace unit 150 of the desk screen 100, and double clicks the one file 10. Then, (2) the user clicks the close button 250 of the viewer screen 200 to close the viewer screen 200 which represents the one file 10. Furthermore, (3) the user superimposes the pointer on another file 10 in the workspace unit 150 of the desk screen 100 and double clicks the other file 10. Then, (4) the user clicks the close button 250 of the viewer screen 200 to close the viewer screen 200 which represents the other file 10. In this case, the total number of operations by the user is four.

On the other hand, in the function to be proposed, the operation performed by the user is as follows. (1) The user superimposes the pointer on the file 10 in the workspace unit 150, and performs the key operation on both the <Ctrl> key and the <Shift> key. Then, (2) the user superimposes the pointer on the other file 10 in the workspace unit 150, and performs the key operation on both the <Ctrl> key and the <Shift> key. In this case, the total number of operations by the user is two. Then, the number of operations of the function to be proposed is smaller than the number of operations, which are sources of the function to be proposed, by the user.

In the above example, an example is described in which, in a case where the repetitive operation is performed, the pointer is superimposed on the file 10 in the desk screen 100 and a predetermined key operation is performed, the enlarged display screen 400 similar to the viewer screen 200 is displayed. However, the present invention is not limited to the aspect.

The information processing apparatus 1 may present a function of transitioning from the first state to the second state and transitioning from the second state to the first state to the user in a case where, for example, a repetitive operation of changing the screen from the first state to the second state and changing from the second state to the first state is detected. In this case, the number of operations for executing the function to be proposed to the user is smaller than the number of operations, which are the sources of the proposal, of the repetitive operation.

The information processing apparatus 1 performs the function proposal in a case where the operation of clicking the close button 250 to close the viewer screen 200 by the user is detected after the operation of double clicking the file 10 in the workspace unit 150.

The function to be proposed is performed by performing the key operation on both the <Ctrl> key and an <Alt> key in a state in which the pointer of the mouse is superimposed on the file 10. The information processing apparatus 1 displays the viewer screen 200 as long as the keys are pressed in a state in which the pointer is superimposed on the file 10 in the desk screen 100, and non-displays the viewer screen 200 in a case where the keys are released. In the function to be proposed, the number of operations by the user is one and is smaller than the number of operations of the repetitive operation which is the source of the proposal, the number of operations of the repetitive operation being two.

Exception Operation

Next, an exception operation, in which the function proposal is not performed even in a case where the repetitive operation is detected, will be described.

The information processing apparatus 1 does not perform the function proposal in a case where the editing operation is performed on the viewer screen 200. The exception operation is an operation of determining that the function is not presented in a predetermined state in a case where the function proposal is performed. For example, the exception operation includes an operation in which meaning of performing the function proposal becomes low or an operation in which there is a problem in that the function proposal may reduce convenience of the user.

For example, the information processing apparatus 1 displays the viewer screen 200 of the file 10 by receiving the click with respect to the file 10 in the desk screen 100 from the user. Then, there is a case where the editing operation is performed by the user with respect to the file 10 on the viewer screen 200.

Here, it is exemplified that the editing operation with respect to the file 10 is editing the document in a case where the file 10 is a document file. It is exemplified that the editing operation is adding a comment, such as text, to the file 10 or deleting the comment. It is exemplified that the editing operation is adding the tag 10A for writing a memo to a page of the file 10 or deleting the tag 10A from the file 10. It is exemplified that the editing operation is changing a configuration of the page of the file 10. It is exemplified that the editing operation is adding a stamp image, such as a stamp, a secret, and a date stamp, with respect to the page configuring the file 10, or deleting the stamp image. Furthermore, it is exemplified that the editing operation is drawing a figure or a marker on the page of the file 10.

As described above, in a case where the user performs the editing operation on the viewer screen 200, it can be determined that a purpose of the user is not merely viewing the content of the file 10 but editing the file 10. That is, it is considered that the user does not aim to merely view the content of the file 10 in the desk screen 100 by transitioning from the desk screen 100 to the viewer screen 200. In this case, it is not necessary to propose a function of easily performing the transition of the screen as in the enlarged display screen 400. Accordingly, the information processing apparatus 1 does not perform the function proposal in a case where the editing operation with respect to the file 10 is performed on the viewer screen 200.

In addition, there is a case where the user displays a plurality of viewer screens 200 side by side on the liquid crystal display, or displays the viewer screen 200 and screens of another application side by side. In addition, it is exemplified that the display side by side is, for example, a state in which two screens are displayed while being not overlap each other.

As above, in a case where the viewer screen 200 and the other screen are displayed side by side on the liquid crystal display, it is considered that the purpose of the user is to perform work while comparing contents of the plurality of files 10. For example, it is assumed that the user confirms a change while comparing the files 10 before and after review, or inputs a necessary item to the other file 10 while viewing the file 10 received by facsimile. Here, in a case where the information processing apparatus 1 performs the function proposal as in the enlarged display screen 400, there is a possibility that the user cannot perform the operation that is executed by that time. Accordingly, the information processing apparatus 1 does not perform the function proposal in a case where the plurality of viewer screens 200 are displayed side by side or in a case where the viewer screen 200 and the screen of the other application are displayed side by side.

Determination of Function Proposal

Subsequently, determination of any of the functions of the preview screen 300 and the enlarged display screen 400 as the function proposal will be described.

The information processing apparatus 1 of the exemplary embodiment determines the content of the function to be proposed based on the file 10 displayed on the desk screen 100. In the information processing apparatus 1, as an example based on the file 10 displayed on the desk screen 100, any of information of (i) a file display format, (ii) a file display size, (iii) file arrangement, and (iv) file content is used.

Furthermore, the information processing apparatus 1 of the exemplary embodiment determines the content of the function to be proposed based on the operation of the user on the screen.

Figure 10:
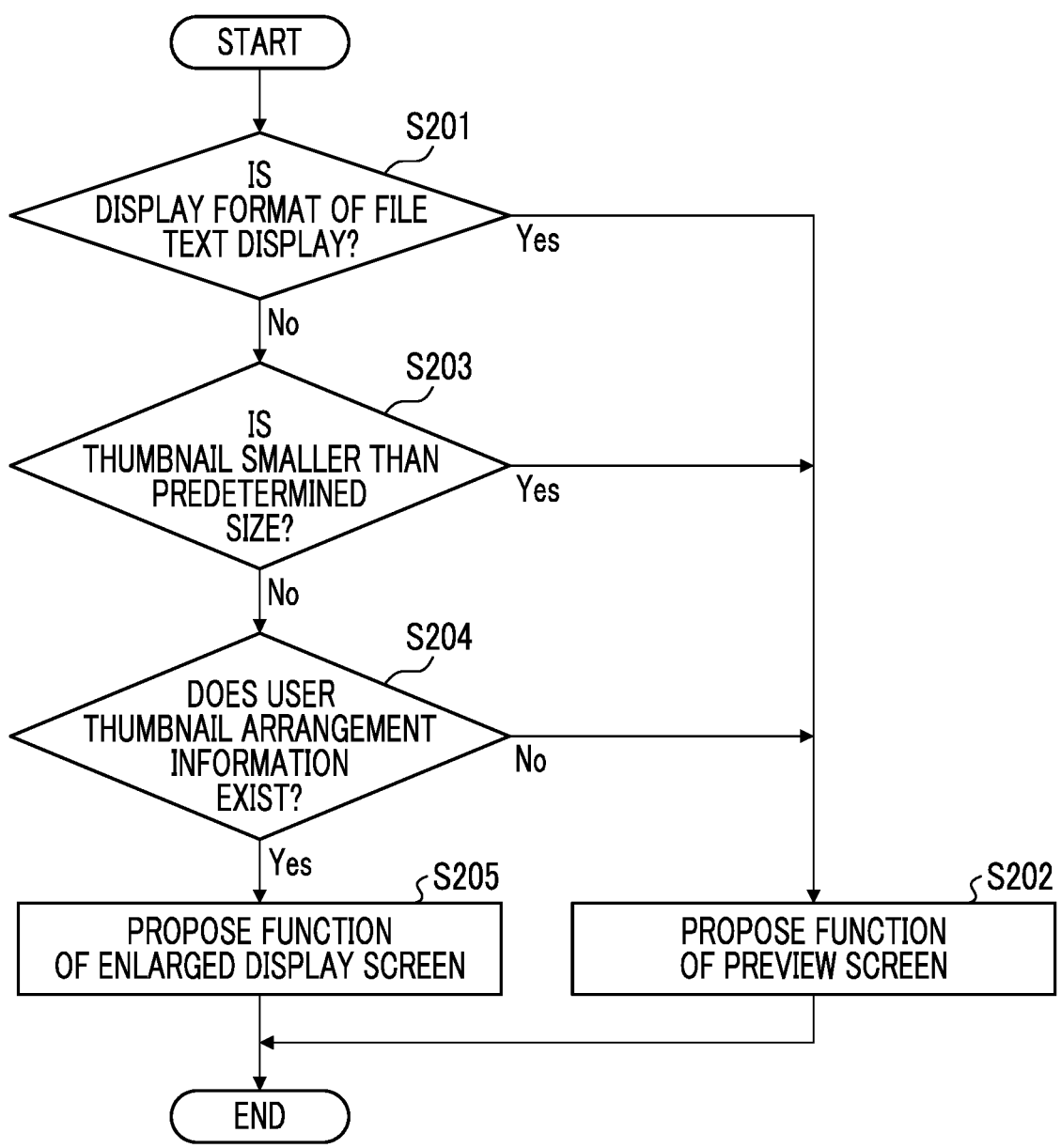
FIG. 10 is a diagram illustrating an operation in a case where the preview screen or the enlarged display screen is proposed.

FIG. 10 is a diagram illustrating an operation in a case where the preview screen 300 or the enlarged display screen 400 is proposed.

In an operational example illustrated in FIG. 10, an example is used in which the function proposal is determined according to (i) the file display format, (ii) the file display size, and (iii) the file arrangement.

As illustrated in FIG. 10, the information processing apparatus 1 determines whether or not the display format of the file 10 on the desk screen 100 is the text display (S201). In the workspace unit 150 of the desk screen 100 of the exemplary embodiment, the file 10 is displayed in any of the display formats of the text display (see FIG. 3) and the thumbnail display (see FIG. 2). Then, in a case where the display format of the file 10 is the text display (Yes in S201), a function of displaying the preview screen 300 (for example, an example of the screen in a fourth state) is proposed (S202).

On the enlarged display screen 400 of the exemplary embodiment, the pointer of the mouse is superimposed on an enlargement target file 10, and a predetermined key operation is performed. Then, there is a problem in that the operation of superimposing the pointer on the file 10 displayed by text causes a decrease in user operability. Here, in a case where the display format of the file 10 is the text display, the preview screen 300 is proposed instead of the enlarged display screen 400.

It is exemplified that the proposal of a function of displaying the preview screen 300 (for example, an example of another function) is operating the preview icon 123 with respect to the user. In addition, the proposal of operating the preview icon 123 is performed in the same manner as in a function proposal of displaying the enlarged display screen 400, as described with reference to FIG. 9.

In a case where the display format of the file 10 on the desk screen 100 is not the text display (No in S201), that is, in a case where the display format of the file 10 is the thumbnail display, it is determined whether or not the thumbnail of the file 10 is smaller than the predetermined size (S203). It is exemplified that the predetermined size is a width of the pointer of the mouse displayed on the screen.

In a case where the thumbnail of the file 10 is smaller than the predetermined size (Yes in S203), the process proceeds to S202, and the function of displaying the preview screen 300 is proposed.

Similar to the above-described text display, in a case where the file 10 displayed using the thumbnail is relatively small, there is the problem in that the operation of superimposing the pointer on the file 10 causes the decrease in the user operability. Here, in a case where the thumbnail is smaller than the predetermined size, the preview screen 300 is proposed instead of the enlarged display screen 400.

In a case where the thumbnail of the file 10 is not smaller than the predetermined size (No in S203), that is, in a case where the thumbnail of the file 10 is equal to or larger than the predetermined size, it is determined whether or not the user thumbnail arrangement information exists (S204).

As described with reference to FIG. 2, the thumbnails of the plurality of files 10 in the workspace unit 150 of the desk screen 100 are arranged at random positions by the user and managed as the arrangement information. Then, in a case where the user thumbnail arrangement information does not exist (No in S204), the process proceeds to S202, and a function of displaying the preview screen 300 is proposed.

On the other hand, in a case where the user thumbnail arrangement information exists (Yes in S204), the function of displaying the enlarged display screen 400 is proposed. In a case where the thumbnail arrangement information exists, it is considered that the user attaches seriousness to the display in the workspace unit 150 of the desk screen 100. Here, in a case where the user thumbnail arrangement information exists, the display of the enlarged display screen 400 is proposed in which the user is capable of performing the operation with less sight line movement.

Next, an example of determining the content of the function proposal based on (iv) the file content will be described in detail.

The information processing apparatus 1 determines which function of the preview screen 300 or the enlarged display screen 400 is proposed based on the content of the file 10 displayed on the desk screen 100. Here, it is exemplified that the content of the file 10 is information configuring the file, and includes an image, such as a figure or a photograph, and text such as a document. Then, the information processing apparatus 1 of the exemplary embodiment determines the function proposal according to a ratio of the text and the image in the file 10.

The information processing apparatus 1 proposes the preview screen 300, for example, in a case where an area occupied by the text of the page is relatively large. On the other hand, the information processing apparatus 1 proposes the enlarged display screen 400 in a case where the area occupied by the image of the page is relatively large. It is exemplified that the case where the area occupied by the text or the image of the page is relatively large is a case where the ratio of the page to the area is equal to or greater than 50%.

Here, the enlarged display screen 400 of the exemplary embodiment includes a fixed enlargement magnification of the file 10, and the preview screen 300 allows the user to change the enlargement magnification of the file 10. Here, the information processing apparatus 1 of the exemplary embodiment proposes the preview screen 300 in a case where the area occupied by the text is relatively large, and proposes the enlarged display screen 400 in a case where the area occupied by the image is relatively large.

In addition, the information processing apparatus 1 may determine which function of the preview screen 300 or the enlarged display screen 400 is proposed according to the presence or absence of the tag 10A provided on the file 10.

For example, in a case where the tag 10A exists on the file 10, the information processing apparatus 1 proposes the preview screen 300. On the other hand, in a case where the tag 10A does not exist on the file 10, the information processing apparatus 1 proposes the enlarged display screen 400. The enlarged display screen 400 of the exemplary embodiment does not display the tag 10A attached to the file 10, or displays only a part of the tag 10A. On the other hand, the preview screen 300 displays the tag 10A provided on the file 10 in a state in which the user can confirm the tag 10A. Therefore, the information processing apparatus 1 of the exemplary embodiment proposes the preview screen 300 in a case where the tag 10A exists on the file 10, and proposes the enlarged display screen 400 in a case where the tag 10A does not exist on the file 10.

Next, an example of determining the content of the function proposal based on the operation of the user will be described in detail.

The information processing apparatus 1 may determine the function to be proposed according to the operation of the user in a case where the repetitive operation is being performed. In the exemplary embodiment, after the transition from the desk screen 100 to the viewer screen 200 is performed, the content of the function proposal is determined based on a history of the operation of the user on the viewer screen 200. For example, in a case where an operation of turning the page of the file 10 displayed on the viewer screen 200 is performed, the information processing apparatus 1 proposes the enlarged display screen 400. On the other hand, in a case where the operation of turning the page of the file 10 displayed on the viewer screen 200 is not performed, the information processing apparatus 1 proposes the preview screen 300.

In the preview screen 300 of the exemplary embodiment, it is necessary to turn the page by using the turning icon 312 of the toolbar 310. On the other hand, on the enlarged display screen 400, it is possible to turn the page by operating the right button and the left button of the mouse. Therefore, the information processing apparatus 1 proposes the enlarged display screen 400 in a case where the operation of turning the page is performed on the viewer screen 200, and proposes the preview screen 300 in a case where the operation of turning the page is not performed.

Second Exemplary Embodiment

Next, an information processing apparatus 1 to which a second exemplary embodiment is applied will be described.

Figure 11:
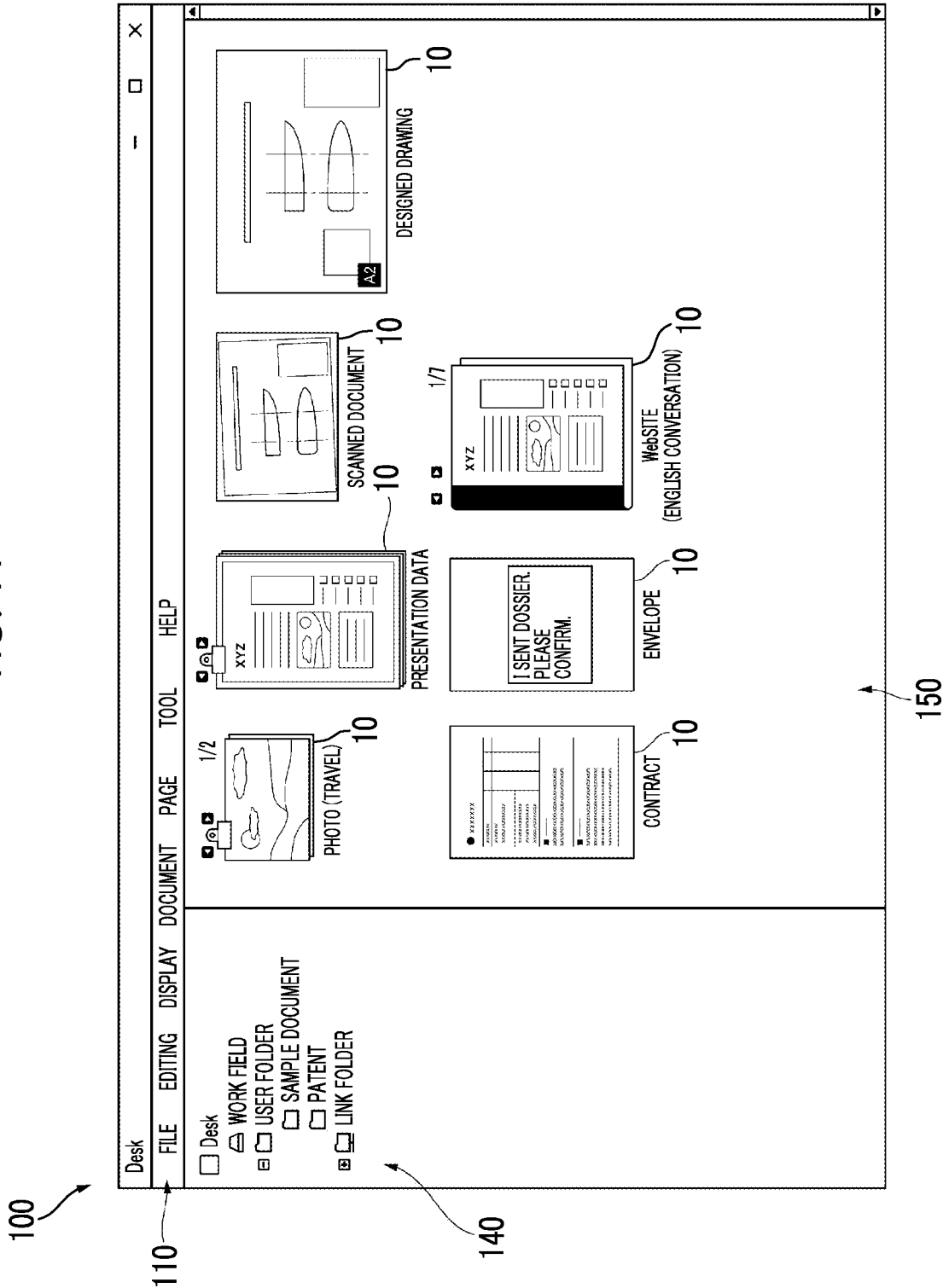
FIG. 11 is an explanatory diagram illustrating a function proposal by an information processing apparatus of a second exemplary embodiment.

FIG. 11 is an explanatory diagram illustrating a function proposal by the information processing apparatus 1 of the second exemplary embodiment.

In the second exemplary embodiment, identical reference numerals are attached to the same components as in the first exemplary embodiment, and description thereof will not be repeated.

The information processing apparatus 1, to which the second exemplary embodiment is applied, proposes a function of collectively non-displaying or collectively displaying the first toolbar 120 and the second toolbar 130 (hereinafter, referred to as a toolbar) in a case where a repetitive operation of non-displaying or displaying the first toolbar 120, the second toolbar 130, or the like on the desk screen 100 is detected.

On the desk screen 100 illustrated in FIG. 11, there is a case where the user operates the setting button 126 to non-display the first toolbar 120 and the second toolbar 130 (for example, an example of the first operation). Then, the information processing apparatus 1 transitions from a state in which the first toolbar 120 and the second toolbar 130 are displayed on the desk screen 100 (for example, an example of the first state) to a state in which the toolbar 120 and the second toolbar 130 are not displayed on the desk screen 100 (for example, the example of the second state), as illustrated in FIG. 11.

Thereafter, the user operates the menu bar 110 on the desk screen 100 illustrated in FIG. 11 to perform an operation of displaying the toolbar (for example, an example of the second operation). Then, the information processing apparatus 1 transitions from the state in which the toolbar is non-displayed on the desk screen 100 to the state in which the toolbar is displayed on the desk screen 100 (see FIG. 2).

Then, in a case where the operation of displaying the toolbar on the desk screen 100 is detected after the operation of non-displaying the toolbar on the desk screen 100 is performed, the information processing apparatus 1 of the second exemplary embodiment proposes a function of collectively non-displaying the toolbar on the desk screen 100 by operating both the <Ctrl> key and an <F1 (function 1)> key.

In a case where the information processing apparatus 1 receives the key operation of both the <Ctrl> key and the <F1> key in a state in which the toolbar is non-displayed on the desk screen 100, the information processing apparatus 1 displays the toolbar again on the desk screen 100.

Here, in a case where the state in which the toolbar is displayed on the desk screen 100 is transitioned to the state in which the toolbar is non-displayed and the state in which the toolbar is non-displayed on the desk screen 100 is transitioned to the state in which the toolbar is displayed, the operation performed by the user is as follows. (1) The user clicks, for example, the setting button 126 of the first toolbar 120. Furthermore, (2) the user clicks a selection item for non-displaying the first toolbar 120 from the setting field displayed in response to the operation with respect to the setting button 126. Furthermore, (3) the user clicks the setting button 126 of the second toolbar 130. Then, (4) the user clicks a selection item for non-displaying the second toolbar 130 from the setting field displayed in response to the operation with respect to the setting button 126. Thereafter, (5) the user clicks the menu bar 110. Then, (6) the user clicks a selection item for displaying the first toolbar 120 and the second toolbar 130 again from the displayed setting field. In this case, the total number of operations by the user is six.

On the other hand, in the function to be proposed, the operation performed by the user is as follows. (1) The user operates both the <Ctrl> key and the <F1> key to non-display the first toolbar 120 and the second toolbar 130 of the desk screen. Thereafter, (2) the user operates both the <Ctrl> key and the <F1> key to display the first toolbar 120 and the second toolbar 130 again on the desk screen 100. In this case, the total number of operations by the user is two. Then, the number of operations of the function to be proposed is smaller than the number of operations, which are sources of the function to be proposed, by the user.

The information processing apparatus 1 of the second exemplary embodiment may determine the function proposal according to the state of the desk screen 100. For example, in a case where a display area of the toolbars occupying the desk screen 100 is larger than a predetermined area, the information processing apparatus 1 may propose a function of collectively non-displaying the toolbars. In addition, in a case where the display magnification of the file 10 in the workspace unit 150 is relatively large and a part of the file 10 is not displayed in the workspace unit 150, the information processing apparatus 1 may propose the function of collectively non-displaying the toolbars.

Subsequently, an exception operation in the information processing apparatus 1 of the second exemplary embodiment will be described.

In a case where a target toolbar to be collectively non-displayed d on the desk screen 100 is used by the user, the information processing apparatus 1 of the second exemplary embodiment does not perform the function proposal. For example, there is a case where the user operates any of icons of the first toolbar 120 or the second toolbar 130. Here, in a case where the user uses the target toolbar to be non-displayed and the function of collectively non-displaying the toolbars is performed, there is a problem in that the user cannot use the toolbar which is being used. Accordingly, in a case where the target toolbar to be collectively non-displayed is used by the user, the information processing apparatus 1 does not propose the function.

In the above example, although description is performed using an example in which the function of collectively non-displaying the toolbars is proposed in a case where a state in which the first toolbar 120 and the second toolbar 130 are displayed is transitioned to a state in which the first toolbar 120 and the second toolbar 130 are not displayed, the present invention is not limited to the example.

For example, in a case where the repetitive operation of individually non-displaying a plurality of icons configuring the first toolbar 120 is performed in a state in which the first toolbar 120 is displayed, the information processing apparatus 1 may propose the function of collectively non-displaying all the toolbars. In this case, a state in which all the toolbars are non-displayed (for example, an example of the third state) is a part of a state in which the plurality of icons configuring the first toolbar 120 are individually non-displayed (for example, an example of the second state).

Furthermore, the function of collectively non-displaying the images configuring the desk screen 100 is not limited to the toolbars. For example, in a case where the preview screen 300 is displayed on the desk screen 100 or in a case where a property screen (not shown) for viewing or editing attribute information of the file 10 is displayed, the images may be collectively non-displayed.

In addition, in the above-described example, although an example in which the images on the desk screen 100 are collectively displayed or collectively non-displayed is used, it is possible to execute the same function with respect to images on the viewer screen 200. Here, in a case where the repetitive operation of non-displaying the images on the viewer screen 200 is performed, the information processing apparatus 1 may propose the above function.

Third Exemplary Embodiment

Next, an information processing apparatus 1 to which a third exemplary embodiment is applied will be described.

Figure 12:
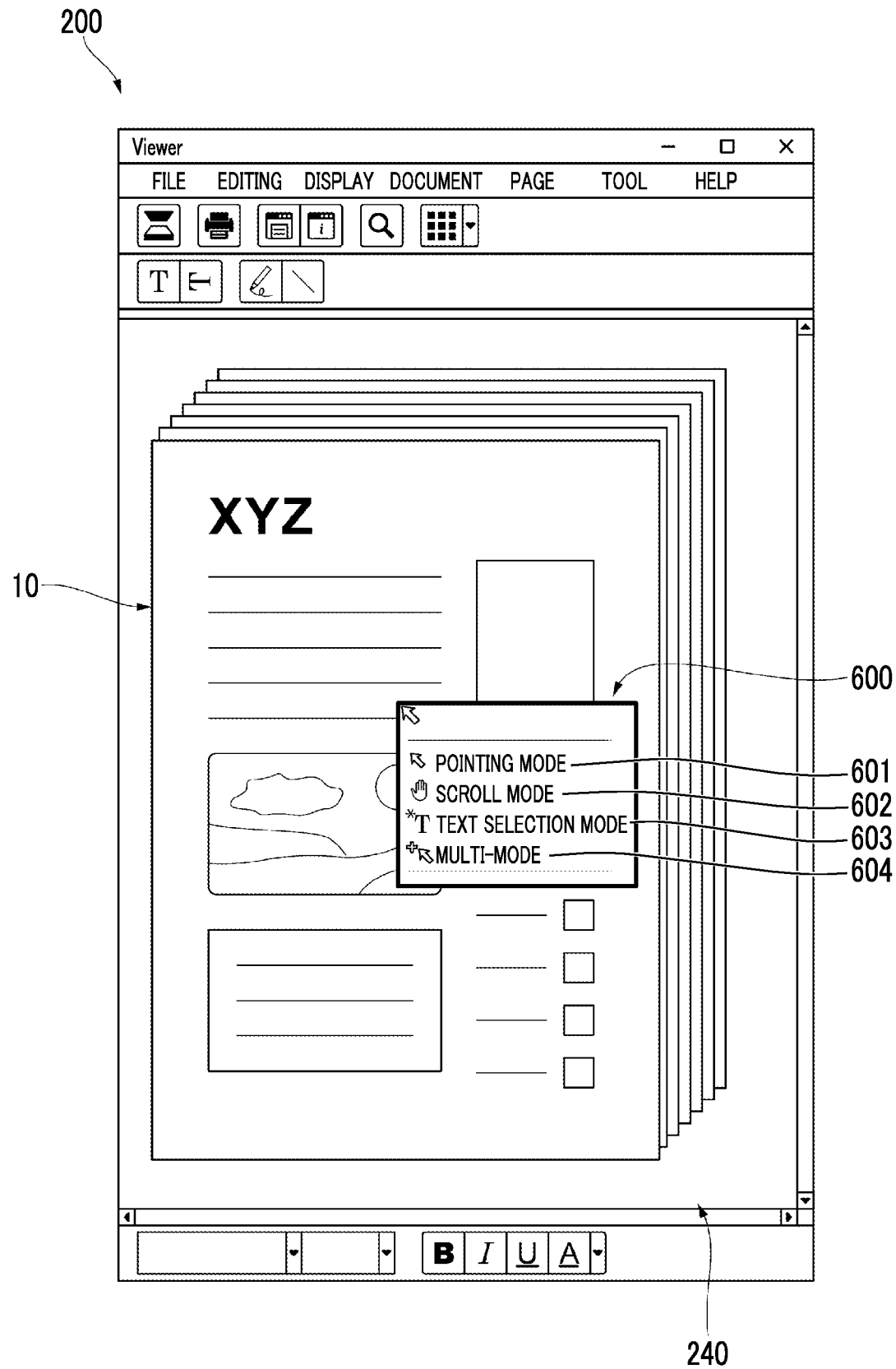
FIG. 12 is an explanatory diagram illustrating a function proposal by an information processing apparatus of a third exemplary embodiment.

FIG. 12 is an explanatory diagram illustrating a function proposal by the information processing apparatus 1 of the third exemplary embodiment.

In the third exemplary embodiment, identical reference numerals are attached to the same components as in the other exemplary embodiments, and description thereof will not be repeated.

In a case where a repetitive operation of changing a function of a mouse is detected, the information processing apparatus 1 to which the third exemplary embodiment is applied proposes a function of a pointer capable of performing a plurality of operations.

As illustrated in FIG. 12, the information processing apparatus 1 displays an operation menu 600 by receiving a click of the right button of the mouse on the viewer screen 200. The operation menu 600 displays a first setting item 601 for setting a pointing mode of pointing or clicking a target image, and a second setting item 602 for setting a scroll mode of moving a display position of a target file 10. In addition, the operation menu 600 displays a third setting item 603 for setting a text selection mode of selecting text in the file 10, and a fourth setting item 604 for setting a multi-mode capable of performing operations of both the scroll mode and the text selection mode. Then, the user sets a mode of the pointer of the mouse by clicking the setting item in the operation menu 600.

Here, in a case where a left button of the mouse is pressed in the multi-mode, the information processing apparatus 1 moves the display position of the target file 10. In addition, in a case where a right button of the mouse is pressed in the multi-mode, the information processing apparatus 1 allows the text described in the file 10 to be selected. In this way, the multi-mode has a state similar to the scroll mode or the text selection mode.

Then, in a case where the second setting item 602 is specified in the operation menu 600 (for example, an example of a first operation) in a state of being set to the pointing mode (for example, an example of a first state), the information processing apparatus 1 transitions to the scroll mode (for example, an example of a second state). Furthermore, in a case where the third setting item 603 is specified in the operation menu 600 (for example, an example of a first operation), the information processing apparatus 1 transitions to the text selection mode (for example, an example of the second state). Thereafter, in a case where the first setting item 601 is specified in the operation menu 600 (for example, an example of a second operation), the information processing apparatus 1 transitions to a state set as the pointing mode.

Then, in a case where an operation of setting as the pointing mode is detected after an operation of changing from the pointing mode to the scroll mode and further an operation of changing to the text selection mode, the information processing apparatus 1 of the third exemplary embodiment displays the operation menu 600 and proposes a function of setting a state of being set as the multi-mode (for example, an example of the third state).

Here, in a case where a state in which the mouse is set to the pointing mode is transitioned to the state in which the mouse is set to the scroll mode, further, the state in which the mouse is set to the text selection mode, and is transitioned to the state in which the mouse is set to the pointing mode, the operation performed by the user is as follows. (1) The user clicks the right button of the mouse to display the operation menu 600. Then, (2) the user clicks the second setting item 602. In addition, (3) the user clicks the right button of the mouse again to display the operation menu 600. Then, (4) the user clicks the third setting item 603. Furthermore, (5) the user clicks the right button of the mouse to display the operation menu 600. Then, (6) the user clicks the first setting item 601. In this case, the total number of operations by the user is six.

On the other hand, in the function to be proposed, the operation performed by the user is as follows. (1) The user clicks the right button of the mouse to display the operation menu 600. Then, (2) the user clicks the fourth setting item 604. Thereafter, (3) the user clicks the right button of the mouse again to display the operation menu 600. Then, (4) the user clicks the first setting item 601. In this case, the total number of operations by the user is four. Then, the number of operations of the function to be proposed is smaller than the number of operations, which are sources of the function to be proposed, by the user.

Hereinabove, although the exemplary embodiment of the present invention has been described, a technical scope of the present invention is not limited to the scope described in the above-described exemplary embodiment. It is apparent that, even in a case where various modifications or improvements are added to the above-described exemplary embodiments, the exemplary embodiment is included in the technical scope of the present invention from description of the claims.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Furthermore, it is possible to provide a program for realizing the information processing apparatus 1 of the exemplary embodiment not only by a communication section but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
transition from a first state to a second state in a case where a first operation is received from a user in the first state;
transition from the second state to the first state in a case where a second operation is received from the user in the second state within a predetermine time; and
present, in a case where the second operation is detected after the first operation, a function of transitioning from the first state to a third state corresponding to the second state and transitioning from the third state to the first state to the user,
wherein a first number of operations of executing the function is smaller than a second number of operations including the first operation and the second operation.

2. The information processing apparatus according to claim 1,
wherein the third state is a state similar to the second state.

3. The information processing apparatus according to claim 1,
wherein a screen in the third state is a screen which displays a part of a screen in the second state.

4. The information processing apparatus according to claim 1,
wherein the processor is configured not to present the function in a case where a screen in the second state is in a predetermined state.

5. The information processing apparatus according to claim 4,
wherein the predetermined state is a state in which the user performs an editing operation.

6. The information processing apparatus according to claim 4,
wherein the predetermined state is a state in which the screen in the second state and another screen are displayed side by side.

7. The information processing apparatus according to claim 1,
wherein the processor is configured to propose another function of transitioning to a screen in a fourth state, which is different from a screen in the second state or in the third state, based on a file displayed on a screen in the first state.

8. The information processing apparatus according to claim 7,
wherein the processor is configured to propose the other function according to a display format of the file on the screen in the first state.

9. The information processing apparatus according to claim 7,
wherein the processor is configured to propose the other function according to a display size of the file on the screen in the first state.

10. The information processing apparatus according to claim 7,
wherein the processor is configured to propose the other function according to arrangement of the file on the screen in the first state.

11. The information processing apparatus according to claim 7,
wherein the processor is configured to propose the other function according to content of the file.

12. The information processing apparatus according to claim 1,
wherein the processor is configured to propose another function of transitioning to a screen in a fourth state, which is different from a screen in the second state and a screen in the third state, based on an operation of the user performed on the screen in the second state.

13. A non-transitory computer readable medium storing a program causing a computer to execute a process, the process comprising:
transitioning from a first state to a second state in a case where a first operation is received from a user in the first state;
transitioning from the second state to the first state in a case where a second operation is received from the user in the second state within a predetermine time; and
presenting, in a case where the second operation is detected after the first operation, a function of transitioning from the first state to a third state corresponding to the second state and transitioning from the third state to the first state to the user,
wherein a first number of operations of executing the function is smaller than a second number of operations including the first operation and the second operation.

14. An information processing apparatus comprising:
means for transitioning from a first state to a second state in a case where a first operation is received from a user in the first state;
means for transitioning from the second state to the first state in a case where a second operation is received from the user in the second state within a predetermine time; and
means for presenting, in a case where the second operation is detected after the first operation, a function of transitioning from the first state to a third state corresponding to the second state and transitioning from the third state to the first state to the user,
wherein a first number of operations of executing the function is smaller than a second number of operations including the first operation and the second operation.

* * * * *